(12) United States Patent
Porta

(10) Patent No.: US 11,080,567 B2
(45) Date of Patent: *Aug. 3, 2021

(54) OBSTACLE DETECTION IN VEHICLE USING A WIDE ANGLE CAMERA AND RADAR SENSOR FUSION

(71) Applicant: Ambarella International LP, Santa Clara, CA (US)

(72) Inventor: Pier Paolo Porta, Fidenza (IT)

(73) Assignee: Ambarella International LP, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/034,556

(22) Filed: Sep. 28, 2020

(65) Prior Publication Data

US 2021/0027118 A1 Jan. 28, 2021

Related U.S. Application Data

(63) Continuation of application No. 16/387,917, filed on Apr. 18, 2019, now Pat. No. 10,860,899.

(30) Foreign Application Priority Data

Oct. 25, 2018 (IT) .......................... 102018000009792

(51) Int. Cl.
*G06K 9/62* (2006.01)
*G01S 15/86* (2020.01)
(Continued)

(52) U.S. Cl.
CPC .............. *G06K 9/6288* (2013.01); *B60R 1/00* (2013.01); *G01S 13/867* (2013.01); *G01S 15/86* (2020.01);
(Continued)

(58) Field of Classification Search
CPC ............... G05D 1/0257; G05D 1/0255; G05D 2201/0213; G01S 17/023; G01S 15/025;
(Continued)

(56) References Cited

U.S. PATENT DOCUMENTS

| 7,511,734 | B2 * | 3/2009 | Ozaki ....................... B60R 1/00 348/143 |
| 2006/0029255 | A1 * | 2/2006 | Ozaki ....................... B60R 1/00 382/104 |

(Continued)

*Primary Examiner* — Boubacar Abdou Tchoussou
(74) *Attorney, Agent, or Firm* — Christopher P. Maiorana, PC

(57) ABSTRACT

An apparatus includes a surround view display and a processing circuit. The processing circuit may be configured to (i) use a first signal from one or more primary surround view cameras to produce a two-dimensional view on the surround view display of an area around a bottom of a vehicle, (ii) detect obstacles around and above a top of the vehicle using a third signal from at least one respective detection and ranging sensor, (iii) divide a second signal from the one or more supplementary cameras into portions to obtain a portion less than an entire field of view of the one or more supplementary cameras in which an obstacle is detected, (iv) perform a dewarping operation on the portion less than the entire field of view of the one or more supplementary cameras in which the obstacle is detected, and (v) generate an overlay view containing the portion less than the entire field of view of the one or more supplementary cameras in which the obstacle is detected on the two-dimensional view of the area around the bottom of the vehicle to inform an operator of the detected obstacle above the vehicle.

20 Claims, 10 Drawing Sheets

(51) Int. Cl.
*G01S 17/86* (2020.01)
*G01S 13/86* (2006.01)
*G05D 1/02* (2020.01)
*G06K 9/00* (2006.01)
*B60R 1/00* (2006.01)
*H04N 5/232* (2006.01)

(52) U.S. Cl.
CPC ............ *G01S 17/86* (2020.01); *G05D 1/0231* (2013.01); *G05D 1/0255* (2013.01); *G05D 1/0257* (2013.01); *G06K 9/00805* (2013.01); *H04N 5/23238* (2013.01); *B60R 2300/105* (2013.01); *B60R 2300/30* (2013.01); *G05D 2201/0213* (2013.01)

(58) Field of Classification Search
CPC ............................ G01S 13/867; G06K 9/6288; G06K 9/00805; B60R 1/00; B60R 2300/105; H04N 5/23238
See application file for complete search history.

(56) References Cited

U.S. PATENT DOCUMENTS

| | | | |
|---|---|---|---|
| 2006/0066835 A1* | 3/2006 | Laufer | B60R 1/00 356/3 |
| 2006/0119472 A1* | 6/2006 | Tsuboi | B60Q 9/006 340/435 |
| 2016/0300113 A1* | 10/2016 | Molin | G06T 7/80 |
| 2017/0124881 A1* | 5/2017 | Whitehead | B60Q 9/008 |
| 2017/0129405 A1* | 5/2017 | Oba | B60R 1/12 |
| 2017/0277961 A1* | 9/2017 | Kuehnle | G06T 3/4038 |
| 2018/0003822 A1* | 1/2018 | Li | G01S 17/89 |
| 2018/0267558 A1* | 9/2018 | Tiwari | H04N 13/204 |
| 2019/0220034 A1* | 7/2019 | Balogh | G05D 1/0246 |

* cited by examiner

OBSTACLE DETECTION IN VEHICLE USING A WIDE ANGLE CAMERA AND RADAR SENSOR FUSION

This application relates to U.S. Ser. No. 16/387,917, filed Apr. 18, 2019, which relates to Italian Application No. 102018000009792, filed Oct. 25, 2018, which are hereby incorporated by reference in their entirety.

FIELD OF THE INVENTION

The invention relates to automated driver assistance systems and autonomous vehicles generally and, more particularly, to a method and/or apparatus for implementing obstacle detection in a vehicle using wide angle camera and radar sensor fusion.

BACKGROUND

Camera systems have been instrumental in providing increased safety by eliminating dead zones (blind spots) and making a driver, or an automatic driver assistance system, aware of obstacles. For large trucks, a conventional surround view camera is placed at the front of the truck enabling detection of obstacles on the road ahead and on the sides. The configuration of large truck forces the surround view camera to be placed relatively low. Because of the low placement, the conventional surround view camera system fails to detect high obstacles, such as branches on the side of the road.

It would be desirable to implement obstacle detection in a vehicle using wide angle camera and radar sensor fusion.

SUMMARY

The invention concerns an apparatus comprising a surround view display and a processing circuit. The processing circuit may comprise a first input to receive a first signal from one or more primary surround view cameras, a second input to receive a second signal from one or more supplementary cameras, a third input to receive a third signal from at least one respective detection and ranging sensor, and an output connected to the surround view display. The processing circuit may be configured to (i) use the first signal from the one or more primary surround view cameras to produce a two-dimensional view on the surround view display of an area around a bottom of a vehicle, (ii) detect obstacles around and above a top of the vehicle using the third signal from the at least one respective detection and ranging sensor, (iii) divide the second signal from the one or more supplementary cameras into portions to obtain a portion less than an entire field of view of the one or more supplementary cameras in which an obstacle is detected, (iv) perform a dewarping operation on the portion less than the entire field of view of the one or more supplementary cameras in which the obstacle is detected, and (v) generate an overlay view containing the portion less than the entire field of view of the one or more supplementary cameras in which the obstacle is detected on the two-dimensional view of the area around the bottom of the vehicle to inform an operator of the detected obstacle above the vehicle.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing obstacle detection in a vehicle using wide angle camera and radar sensor fusion that may (i) utilize a wide angle camera located high on the vehicle, (ii) utilize a camera with a viewing angle of 180 degrees (fisheye), (iii) provide right, center, and left views of a high visual field, (iv) utilize different de-warping operations for right, center, and left views, (v) combine one or more cameras and one or more detection and ranging sensors (e.g., radar, lidar, ultrasound, etc.) configured to detect objects in dead (blind) spots of the vehicle, (vi) utilize detection and ranging sensor output to direct de-warping of camera images, (vii) direct attention of an operator and/or autonomous system to specific direction(s) of detected obstacle(s), (viii) provide additional safety for maneuvering large vehicles, (ix) provide a backup for a primary camera system, and/or (x) be implemented as one or more integrated circuits.

Figure 1:
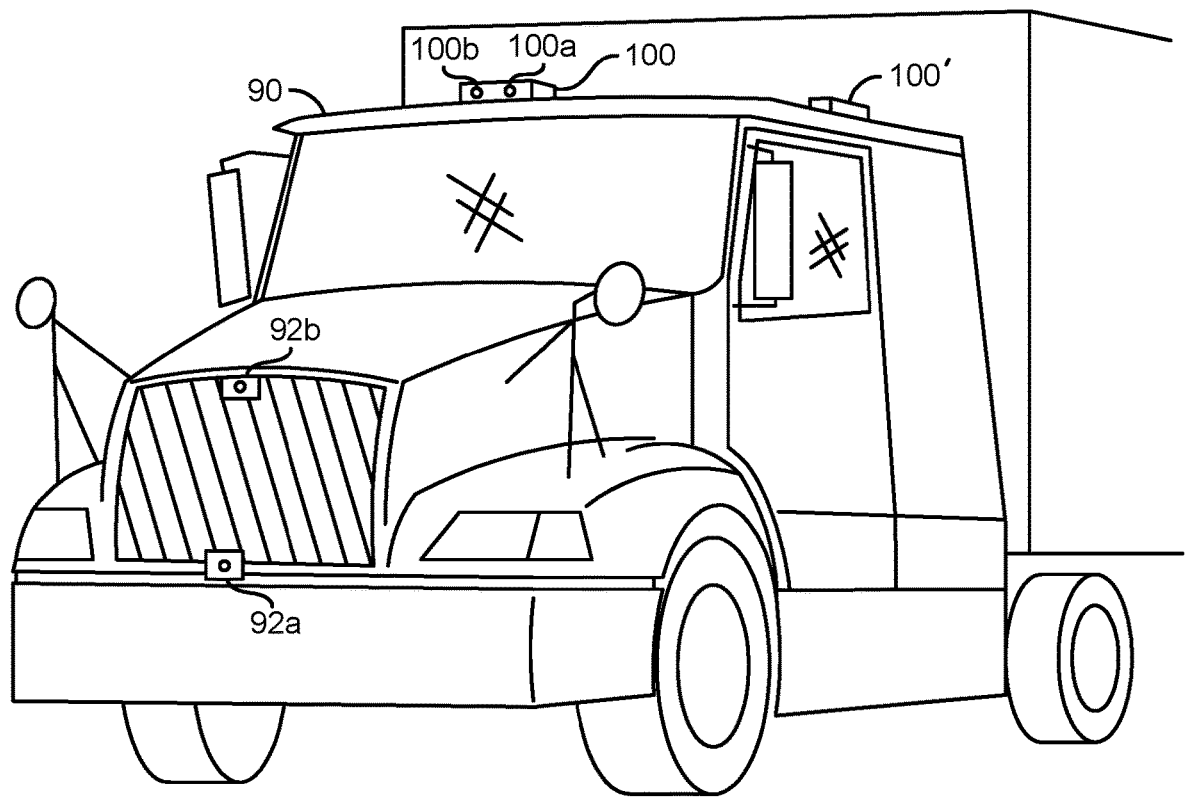
FIG. 1 is a diagram of a vehicle having a primary camera and a supplementary camera and sensor unit in accordance with an embodiment of the invention.

Referring to FIG. 1, a diagram of a vehicle 90 is shown illustrating an example camera and sensor placement in accordance with an embodiment of the invention. In an example, the vehicle 90 may be a large vehicle (e.g., a commercial truck, a semi-tractor trailer, a bus, a passenger vehicle towing a trailer, etc.). In an example, the vehicle 90 may be configured with the engine in front of the passenger compartment. The engine forward arrangement generally limits an amount of the road in front of the vehicle 90 that an operator can see. A first (primary or main) surround view camera 92*a* or 92*b* may be placed at the front (e.g., grill) of the vehicle 90. The primary surround view cameras 92*a* and 92*b* are generally placed below a hood line of the vehicle 90. The primary surround view cameras 92*a* and 92*b* generally enable detection of obstacles on a road surface ahead of and/or to the sides of the vehicle 90. The primary surround view cameras 92*a* and 92*b* generally provide the operator with a view of the road that would otherwise be obscured (e.g., by the hood of the vehicle 90, etc.). In an example, the view provided by the primary surround view cameras 92a and 92b may be displayed on a display screen of a driver assistance system (e.g., described below in connection with FIG. 10).

In various embodiments, a supplementary camera and sensor unit 100 may be placed on the vehicle 90. The supplementary camera and sensor unit 100 is generally placed higher than the primary surround view cameras 92a and 92b. In an example, the supplementary camera and sensor unit 100 may be placed on a roof of the vehicle 90. In various embodiments, the supplementary camera and sensor unit 100 comprises a supplementary camera 100a and a detection and ranging sensor or sensors 100b (e.g., radar, lidar, ultrasound, etc.). In an example, the supplementary camera and sensor unit 100 may comprise a supplementary camera 100a placed on the vehicle higher than the primary surround view camera 92a or 92b and at least one detection and ranging sensor 100b mounted adjacent to the supplementary camera 100a and configured to detect obstacles within a field of view of the supplementary camera 100a. In an example, the supplementary camera and sensor unit 100 is generally configured to have a wide viewing angle (e.g., less than or substantially equal to 180 degrees). In an example, the supplementary camera and sensor unit 100 may utilize a fisheye lens. In various embodiments, the supplementary camera and sensor unit 100 may be connected to (or be part of) an automated driver assistance system and/or autonomous vehicle system. In an example, the system may comprise processing circuitry configured to perform an appropriate de-warping operation to provide views of particular portions (e.g., right, center, left, etc.) of the higher visual field. The de-warping operation generally refers to a process of correcting a perspective of an image to reverse effects of geometric distortions (e.g., caused by a camera lens). De-warping allows the supplementary camera and sensor unit 100 to cover a wide area with a single device (e.g., using a fisheye or panoramic lens), while still having a "normal" view of an otherwise distorted or reversed image.

In various embodiments, the detection and ranging sensor 100b (e.g., radar, ultrasound, lidar, etc.) of the supplementary camera and sensor unit 100 may be configured (designed) to detect objects in dead (or blind) spots relative to the primary surround view camera 92a or 92b and the operator of the vehicle 90. The detection and ranging sensor output may be combined (e.g., using sensor fusion) with the output of the supplementary camera 100a to direct dewarping of the camera output so that attention of the operator (or an autonomous system) can be directed toward the specific direction of a detected obstacle or obstacles. Sensor fusion generally refers to combining various types of sensory data or data derived from various sources in order to provide a result that is more accurate than would be possible using the sources individually. In various embodiments, sensor fusion operations may include, but are limited to, aligning data from the camera(s) 100a and the detection and ranging sensor(s) 100b, providing obstacle tracking, and/or providing obstacle detection, recognition, and/or identification. The supplementary camera and sensor unit 100 with camera and sensor fusion generally provides additional safety for maneuvering large vehicles in narrow and/or cluttered environments (e.g., urban areas, etc.).

In some embodiments, separate cameras 100a and/or detection and ranging sensors 100b or 100' may be placed on the top of the vehicle 90. The detection and ranging sensors 100' may be placed to have views of either side of the vehicle 90. The additional cameras and/or detection and ranging sensors 100' generally provide greater coverage of the area surrounding the vehicle 90 in which elevated obstacles may pose risks while maneuvering the vehicle 90.

Figure 2:
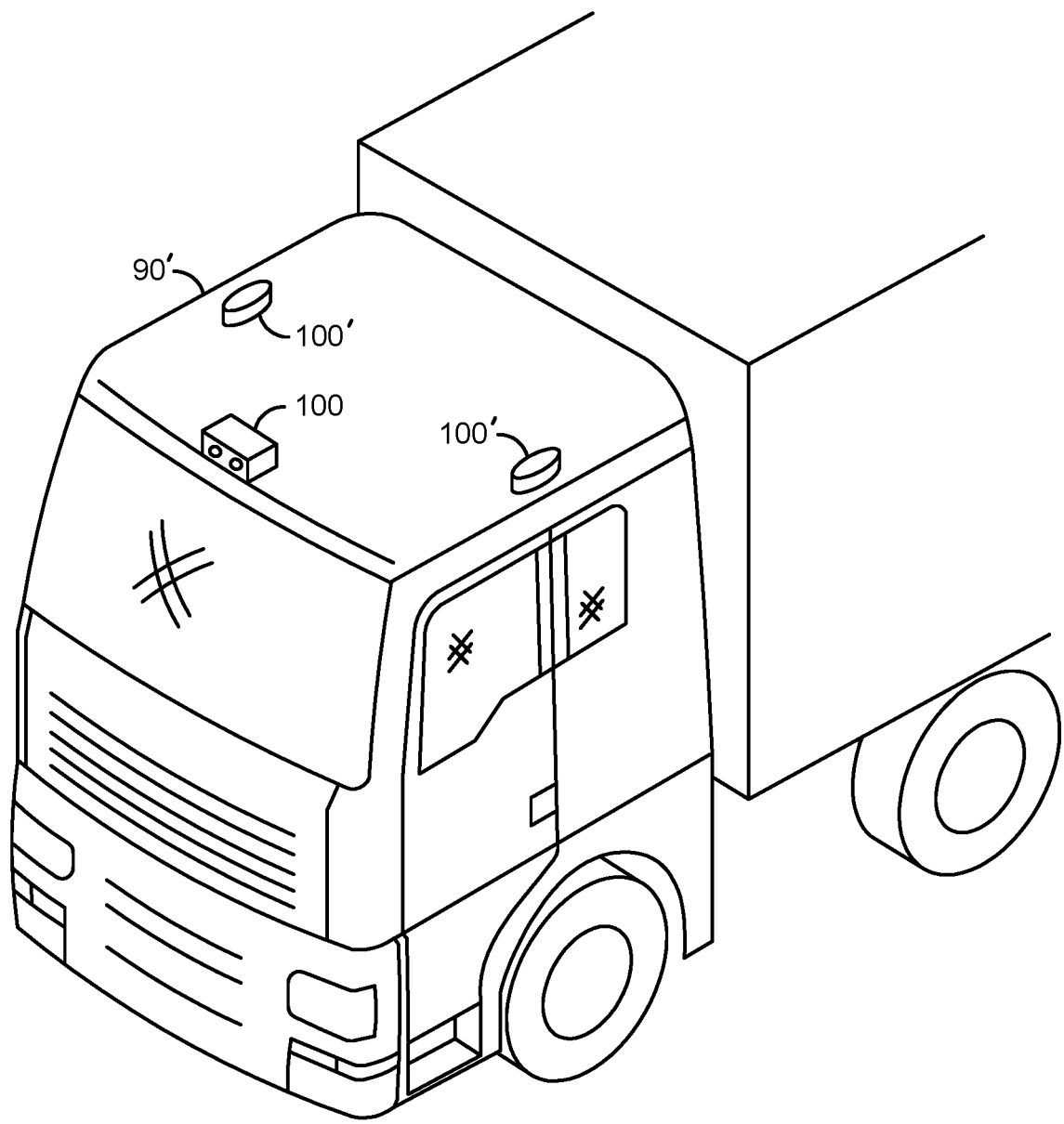
FIG. 2 is a diagram illustrating an example of another vehicle with camera and sensor units in accordance with an embodiment of the invention.

Referring to FIG. 2, a diagram is shown illustrating another example of a vehicle 90' with a camera and sensor placement in accordance with an embodiment of the invention. In an example, the vehicle 90' may have the engine under, in, or behind the passenger compartment resulting in a flat front rather than a hood. In embodiments where the vehicle has a flat front, if the supplementary camera and sensor unit 100 is mounted right above the primary camera (e.g., 92a or 92b), the supplementary camera and sensor unit 100 could also work as a substitute (or backup) for the primary surround view camera 92a or 92b. The supplementary camera and sensor unit 100 could also eliminate the primary surround view camera 92a or 92b.

Similar to the vehicle 90, in some embodiments, separate cameras 100a and/or detection and ranging sensors 100b or 100' may be placed on the top of the vehicle 90'. The detection and ranging sensors 100' may be placed to have views of either side of the vehicle 90'. The additional cameras and/or detection and ranging sensors 100' may provide greater coverage of the area surrounding the vehicle 90' in which elevated obstacles may pose risks while maneuvering the vehicle 90'.

Figure 3:
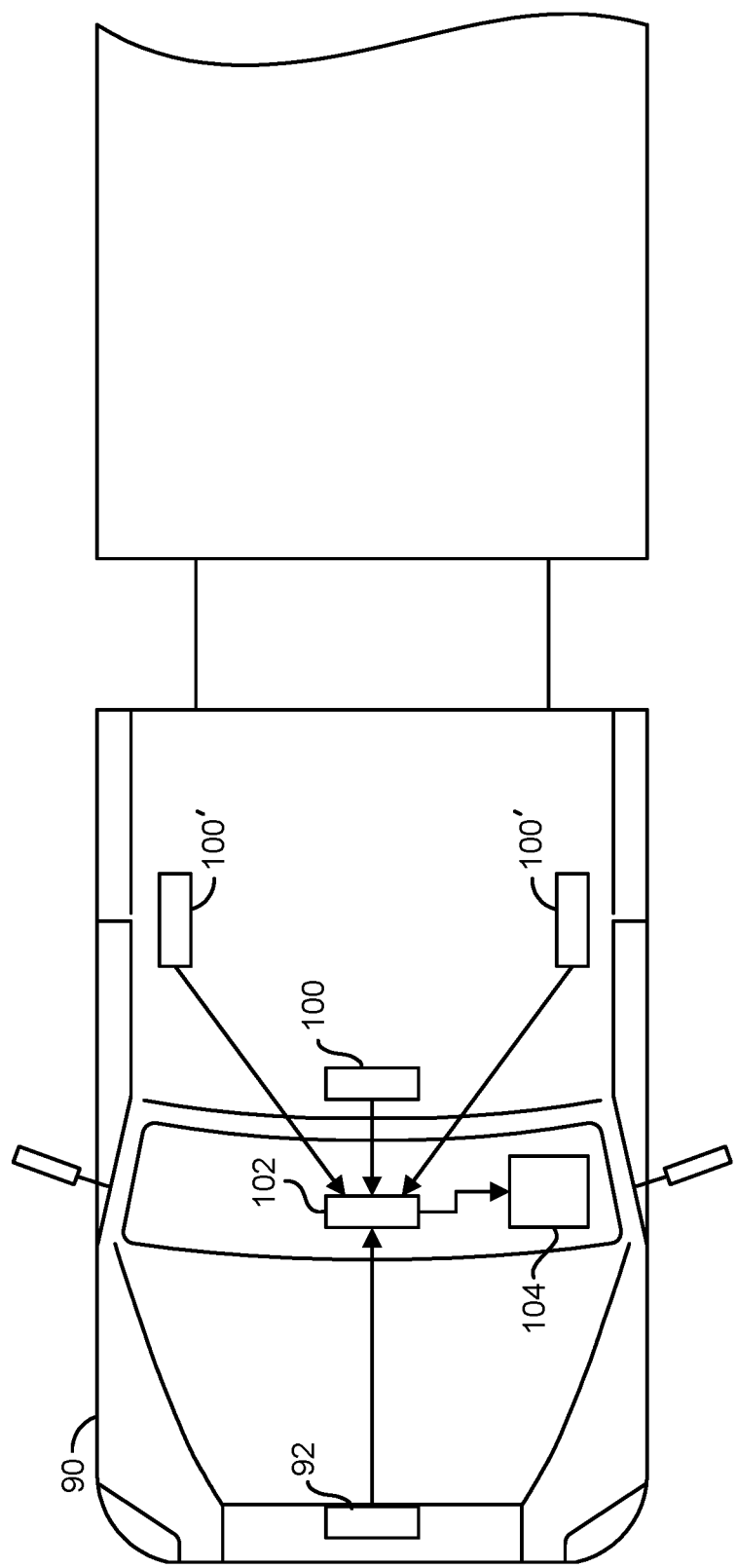
FIG. 3 is a diagram of a system in accordance with an embodiment of the invention.

Referring to FIG. 3, a diagram of the vehicle 90 is shown illustrating components of a driver assistance system with an obstacle detection capability in accordance with an embodiment of the invention. In an example, the system generally comprises a first (primary) surround view camera 92, the supplementary camera 100a and/or sensor units 100b and 100', a block (or circuit) 102, and a block (or circuit) 104. The circuits 102 and 104 may be implemented in hardware, software, firmware or any combination thereof in an apparatus.

In some embodiments, the vehicle 90 may be an automobile, a truck, a van, a delivery vehicle, a commercial vehicle, a train, a plane, etc. The type of vehicle 90 may be varied according to the design criteria of a particular implementation. The vehicle 90 generally comprises a passenger compartment (or cabin). An operator, when present, may be situated in the passenger compartment. In an example, the circuit 104 may be oriented to face the operator.

The circuit 102 may implement a processor circuit. In some embodiments, the processor circuit may comprise one or more processors, including but not limited to one or more central processor units, one or more image signal processors, one or more video signal processors, and/or one or more digital signal processors. The circuit 102 is generally operational to process video signals generated by the camera 92 and video and sensor signals generated by the supplementary camera and sensor units 100 and/or 100'. In an example, the processor circuit 102 may be configured to dewarp the video signal generated by the camera and sensor units 100 and 100' based upon the sensor signal generated by the camera and sensor unit 100. The dewarped video signal may be presented to the circuit 104 for display to the operator. In an example, the circuit 104 may be configured to provide a two-dimensional simulated surround view of the vehicle 90. The two-dimensional surround view may combine imaging of a road surface and imaging of elevated obstacles near the vehicle 90.

The circuit 104 may implement a display circuit. The display circuit 104 is generally operational to display the dewarped video created by the processor circuit 102 to the operator. In various embodiments, the display 104 may comprise a two-dimensional display. In some embodiments, the display 104 may comprise a virtual display.

The circuit 102 may be coupled to the primary camera 92 and the camera and sensor units 100 and/or 100' using a variety of interfaces. In an example, the circuit 102 may be coupled using either serial channels or direct video input ports. In an example, the circuit 102 may be configured to support a number of image sensor interfaces (or protocols) including, but not limited to, SLVS, MIPI CSI-2, LVCMOS, and 16-bit parallel.

Figure 4:
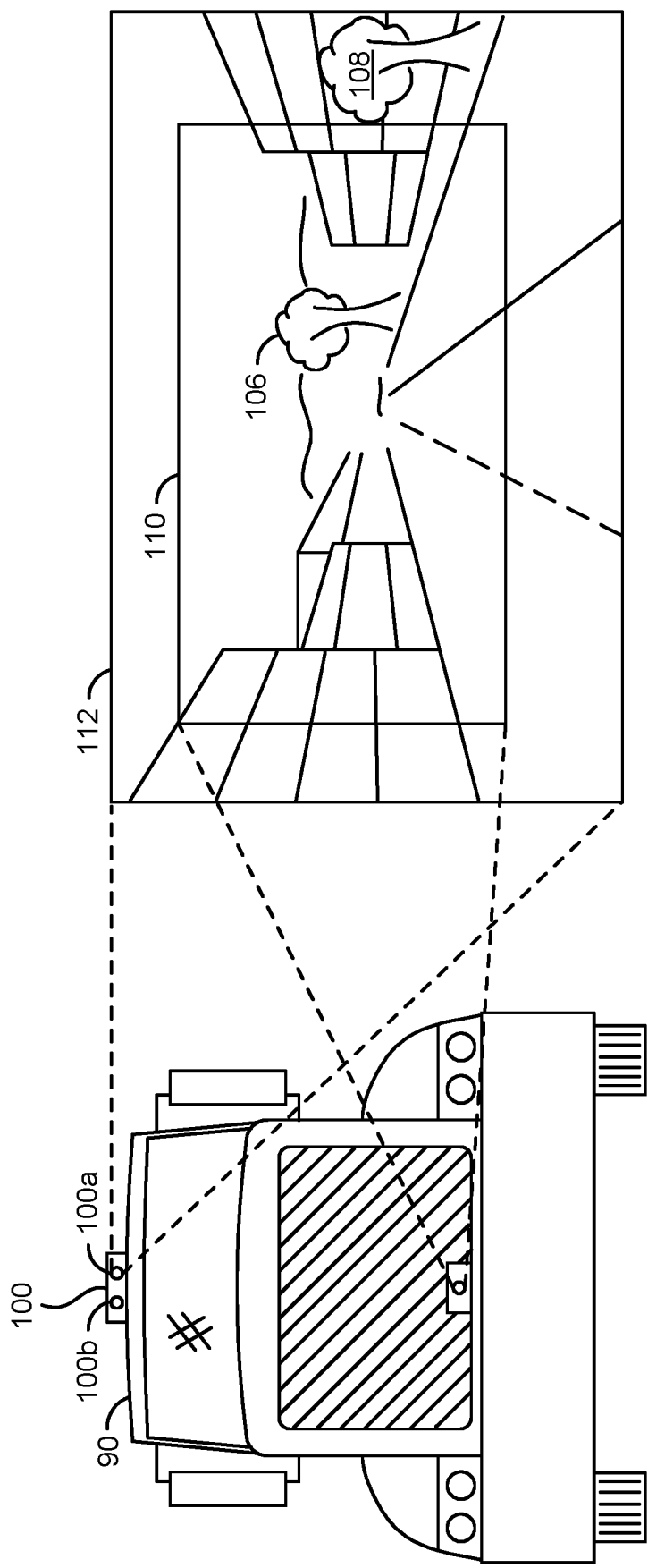
FIG. 4 is a diagram illustrating respective fields of view provided by the primary camera and the supplementary camera of FIG. 1.

Referring to FIG. 4, a diagram is shown illustrating respective fields of view provided by the primary surround view camera 92a and the supplementary camera and sensor unit 100 of FIG. 1. In an example, the view forward from the vehicle 90 is generally illustrated by views 110 and 112. The primary surround view camera 92a generally sees the view 110. The supplementary camera and sensor unit 100 generally sees the view 112. The view 112 generally encompasses a portion of the view 110. For example, both the view 110 and the view 112 show a tree 106 along the road ahead of the vehicle 90. In various embodiments, the view 112 provided by the supplementary camera and sensor unit 100 contains material not seen by the primary surround view camera 92a. For example, the supplementary view 112 generally allows detection of obstacles (e.g., a tree 108) to a side of the vehicle 90 or above the vehicle 90. In various embodiments, the supplementary camera and sensor unit 100 may be further configured to detect a location of obstacles in the view 112 and show an operator a portion of the view 112 having only the detected obstacle. In various embodiments, the view from the primary surround view camera 92a is combined with the portion of the view 112 containing the detected obstacle and presented to the operator of the vehicle 90 as a two-dimensional surround view representation (or simulation).

Figure 5:
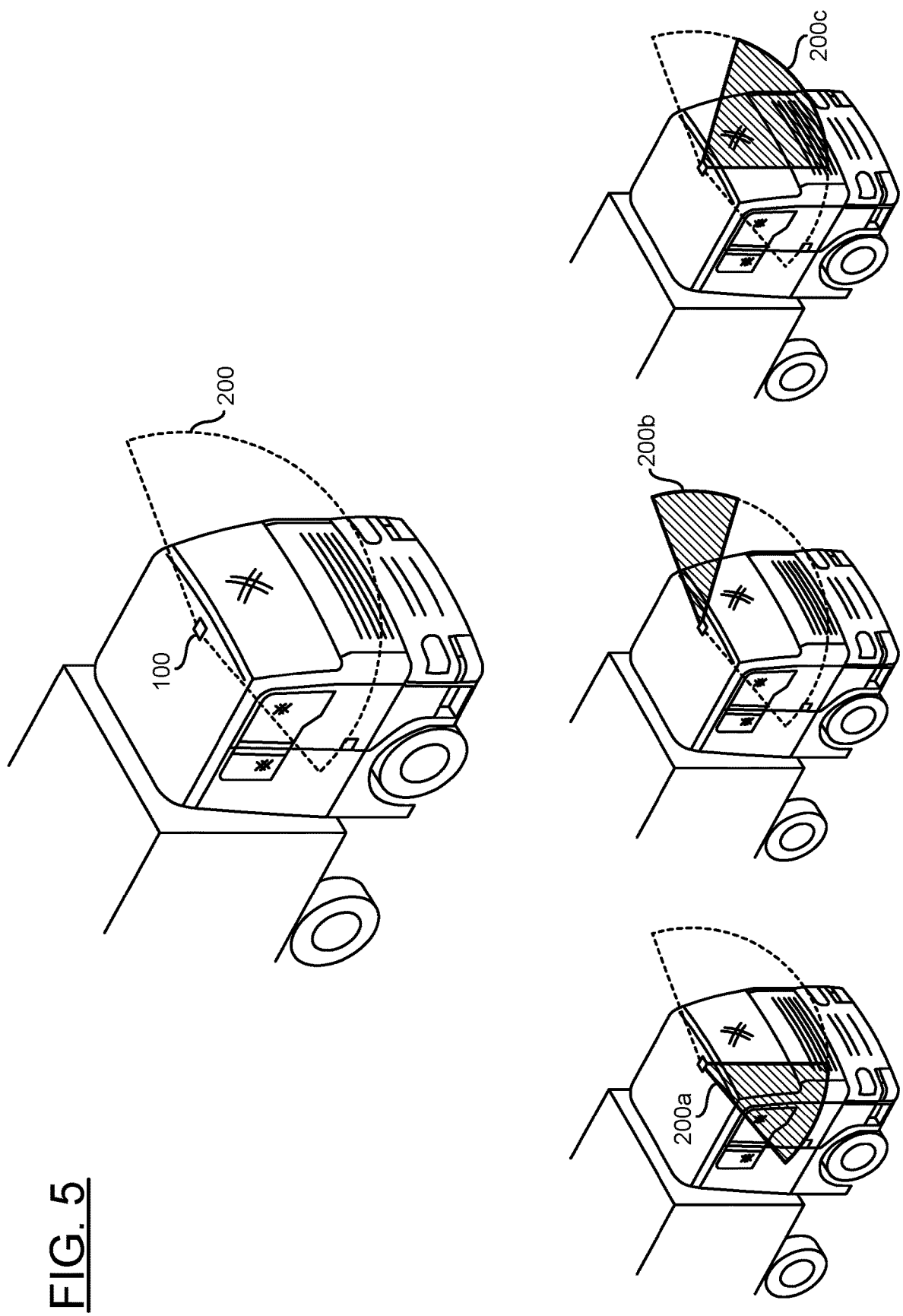
FIG. 5 is a diagram illustrating example viewing angle of a supplementary camera and sensor unit of FIG. 2.

Referring to FIG. 5, a diagram illustrating an example viewing angle of the supplementary camera and sensor unit 100 of FIG. 2 is shown. In an example, the supplementary camera and sensor unit 100 is generally configured to provide a wide field of view. In an example, the field of view may be defined by a horizontal viewing angle 200. In an example, the viewing angle 200 may be implemented as less than or substantially equal to a viewing angle of 180 degrees. In an example, a fisheye lens may be used to provide the wide viewing angle.

In various embodiments, the supplementary camera and sensor unit 100 may be connected to (or be part of or integrated with) a driver assistance and/or autonomous vehicle system. In various embodiments, the driver assistance system and/or autonomous vehicle system generally provide fusion of (i) a camera output and (ii) a distance and ranging output from the supplementary camera and sensor unit 100. In some embodiments, the supplementary camera and sensor unit 100 may be configured to provide fusion of (i) the camera output and (ii) the distance and ranging output to provide a composite output to the driver assistance and/or autonomous vehicle system. In some embodiments, the supplementary camera and sensor unit 100 may be configured to provide fusion of (i) the camera output and (ii) the distance and ranging output to provide only a portion of the camera output containing a detected obstacle to the driver assistance and/or autonomous vehicle system.

In an example, the driver assistance and/or autonomous vehicle system may be configured to perform an appropriate de-warping operation on the camera output to focus attention of the operator on a particular portion or portions of the field of view of the supplementary camera and sensor unit 100 based on obstacles detected by distance and ranging sensor(s) 100b of the supplementary camera and sensor unit 100. In an example, the field of view of the supplementary camera and sensor unit 100 may be divided into three viewing angle portions; a right portion (or view) 200a, a left portion (or view) 200b, and a center portion (or view) 200c. However, other numbers of portions (or views) may be implemented accordingly to meet design criteria of a particular implementation. By reducing the amount of the view angle 200 based on obstacle detection to one or more of the portions 200a-200c, the supplementary camera and sensor unit 100 generally allows detected obstacles to be brought to the attention of the operator more quickly. For example, by providing only a narrow portion of the viewing angle 200 containing the detected obstacle, the operator does not have to spend time scanning the entire viewing angle 200 looking for the obstacle that was indicated as having been detected. Thus, an improvement in performance and/or response time may be achieved.

Figure 6:
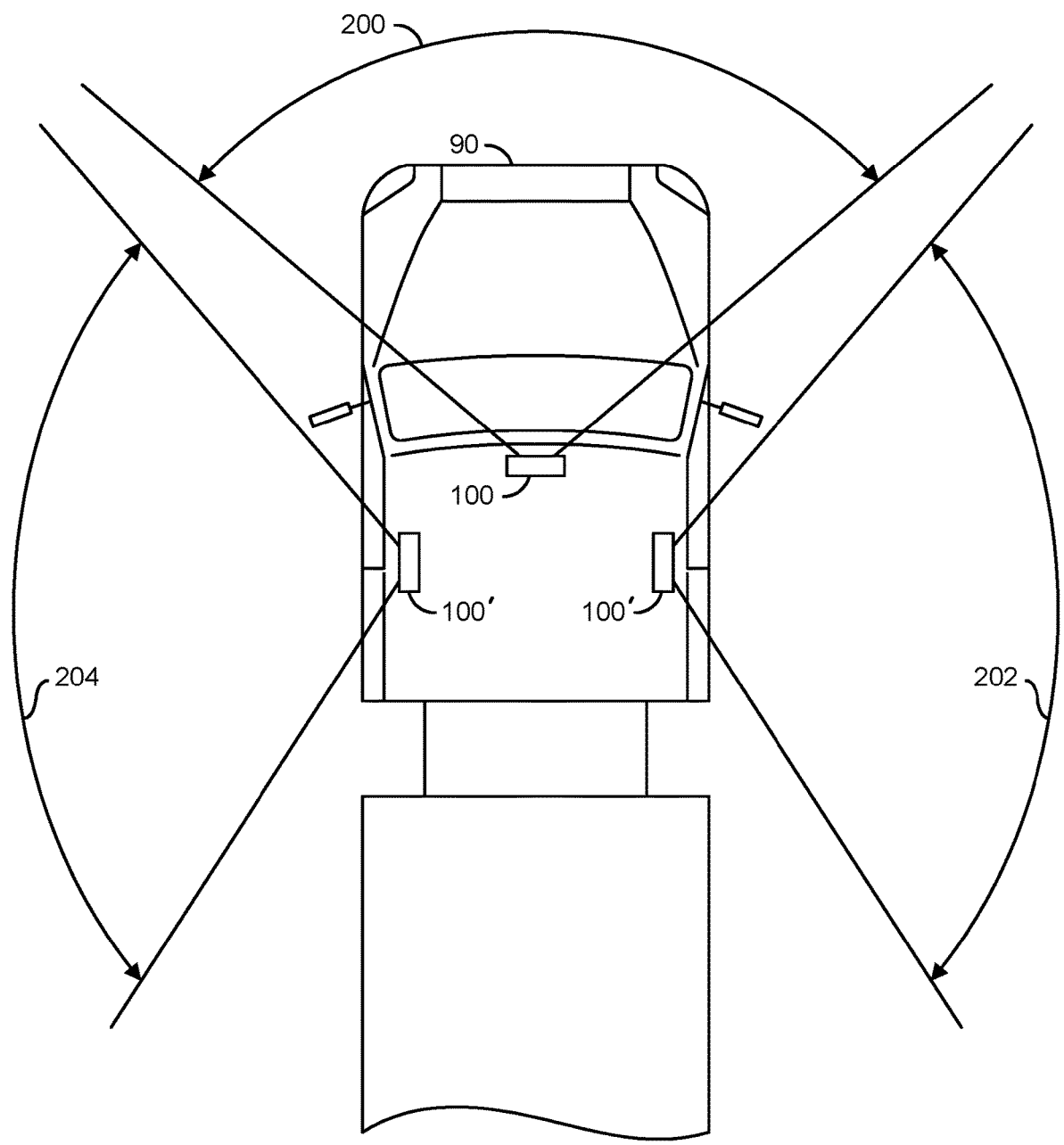
FIG. 6 is a diagram illustrating an example viewing angles of supplementary camera and sensor units of FIG. 1.

Referring to FIG. 6, a diagram is shown illustrating example viewing angles of the supplementary camera and sensor units 100 and 100' mounted on top of the vehicle 90 of FIG. 1. In an example, the supplementary camera and sensor units 100 and 100' are generally configured to provide similar fields of view. In an example, supplementary camera and sensor units 100 provides the field of view defined by the horizontal viewing angle 200. A supplementary camera and sensor unit 100' on the right side of the vehicle 90 may provide a field of view defined by a horizontal viewing angle 202. A supplementary camera and sensor unit 100' on the left side of the vehicle 90 may provide a field of view defined by a horizontal viewing angle 204. In an example, the viewing angles 200, 202, and 204 may be implemented as 180 degrees (e.g., using a fisheye lens).

In various embodiments, the supplementary camera 100a and sensor units 100b and 100' may be connected to (or be part of) a driver assistance and/or autonomous vehicle system. In various embodiments, the driver assistance and/or autonomous vehicle system generally provide fusion of (i) the camera output(s) and (ii) the distance and ranging sensor output(s) from the supplementary camera and sensor units 100 and/or 100'. In some embodiments, the supplementary camera and sensor units 100 and/or 100' may be configured to provide fusion of (i) the camera output and (ii) the distance and ranging sensor output to provide a composite output to the driver assistance and/or autonomous vehicle system.

The driver assistance system and/or autonomous vehicle system are generally configured to perform an appropriate de-warping operation on the camera output to focus attention of the operator on a portion or portions of the field of view of the supplementary camera and sensor units 100 and/or 100' based on obstacles detected by the distance and ranging sensor(s) 100b and 100'. By reducing the amount of the view angles 200, 202, and 204 to one or more of the portions based on obstacle detection, the supplementary camera and sensor units 100 and/or 100' allow detected obstacles to be brought to the attention of the operator more quickly. For example, by providing only a narrow portion of the viewing angle containing the detected obstacle, the operator does not have to spend time scanning the entire viewing angle looking for the obstacle that was indicated as having been detected. Thus, an improvement in performance and/or response time may be achieved.

Figure 7:
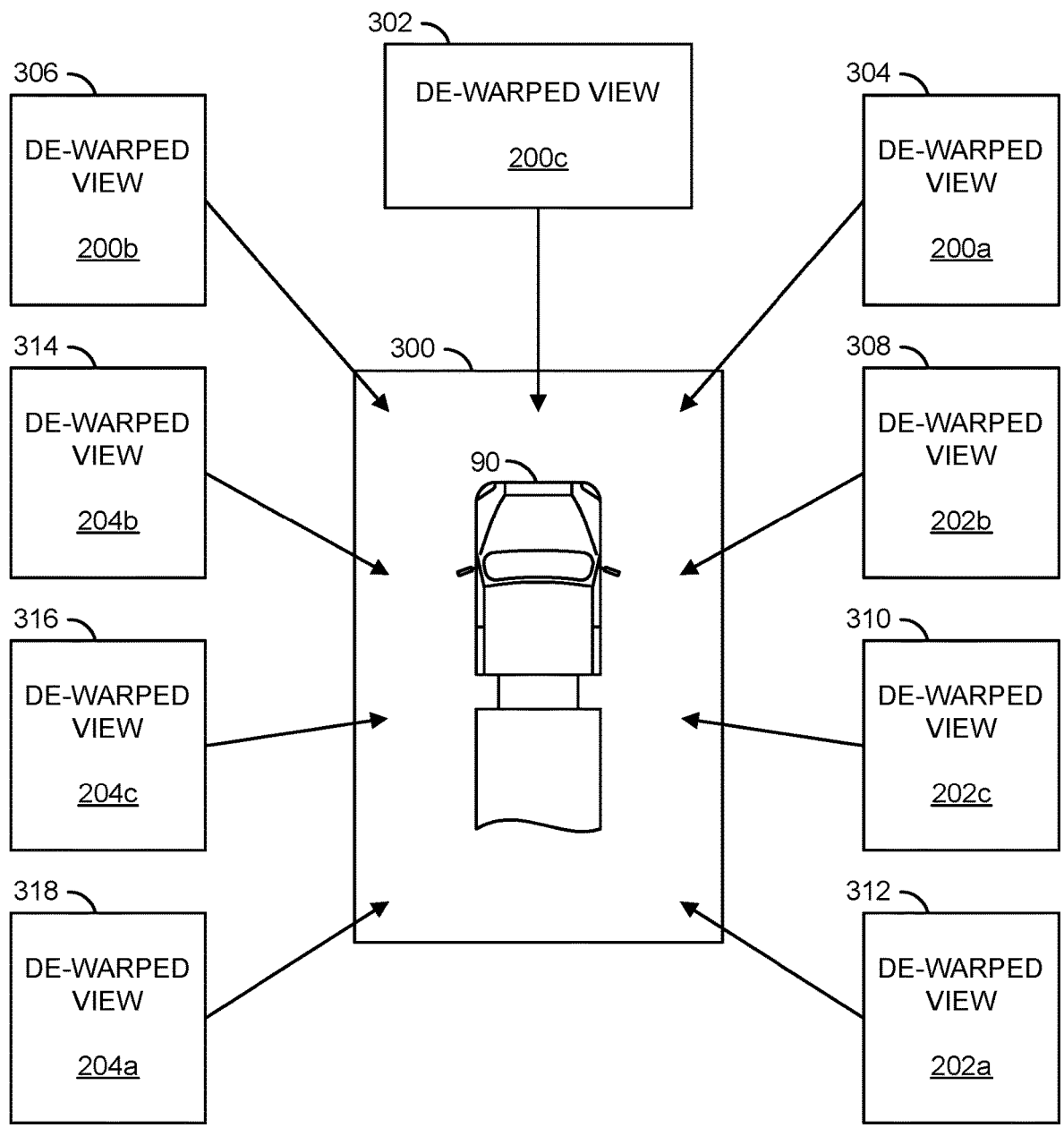
FIG. 7 is a diagram illustrating an example surround view simulation in accordance with an embodiment of the invention.

Referring to FIG. 7, a diagram illustrating a surround view simulation in accordance with an example embodiment of the invention is shown. In various embodiments, an operator assistance display may be generated comprising a simulated surround (or bird's eye) view 300 and one or more overlay views 302-318. In an example, the surround view 300 may be generated using image data from one or more cameras having a view of the ground (roadway) around the vehicle 90. In an example, the surround view 300 may be generated using conventional techniques. In various embodiments, the overlay views 302-318 may be generated using image data and detection and ranging sensor data from one or more cameras 100a and detection and ranging sensors 100b mounted on top of the vehicle 90. In an example, the detection and ranging sensor(s) 100b may be used to detect obstacles (objects) around and above the vehicle 90. Outputs from the detection and ranging sensor(s) 100b may be used to identify obstacles and/or direct de-warping operations to produce the overlay views 302-318. In an example, each of the overlay views 302-318 may be generated from a portion of a respective wide angle image captured by the one or more cameras 100a and detection and ranging sensors 100b mounted on top of the vehicle 90.

In an example, a driver assistance system in accordance with an embodiment of the invention may be configured to generate only those overlay views 302-318 containing a detected obstacle. Limiting the number of overlay views generated to those containing detected objects may optimize resource utilization (e.g., de-warping engines, image processors, digital signal processors, memory, etc.) and performance of the driver assistance system in providing information to the operator of the vehicle 90.

Figure 8:
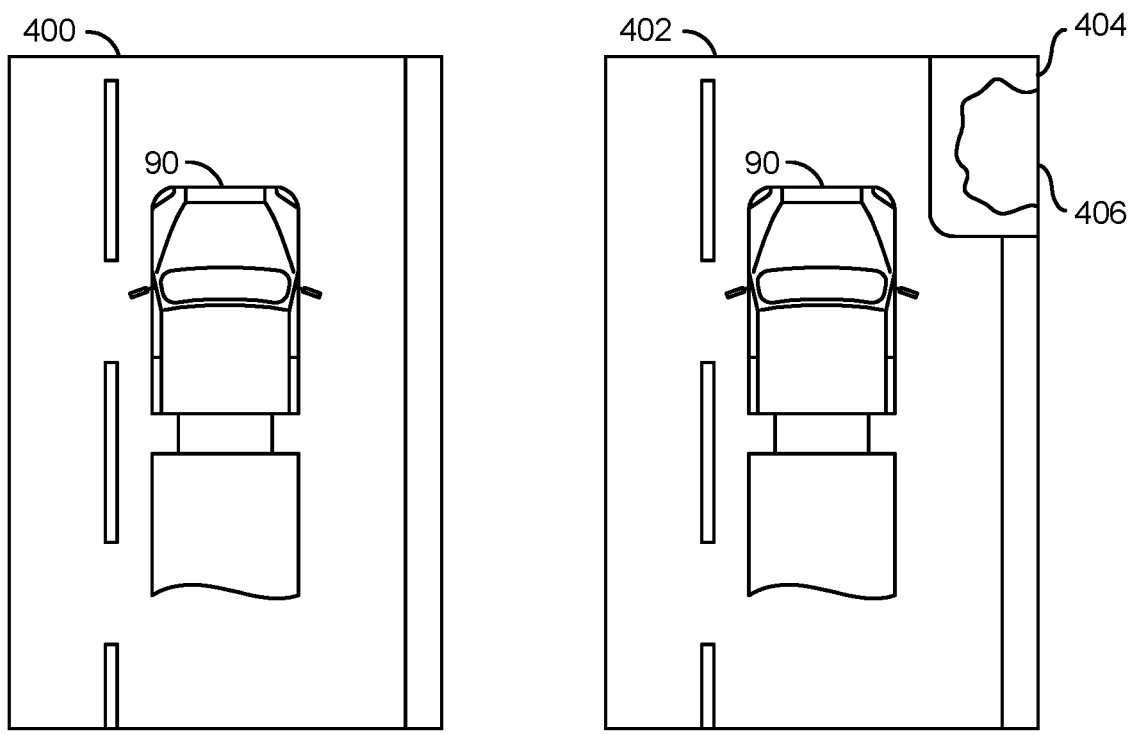
FIG. 8 is a diagram illustrating a comparison between a driver assistance display with and without camera and sensor fusion in accordance with an embodiment of the invention.

Referring to FIG. 8, a diagram illustrating a comparison between a driver assistance display with and without camera and sensor fusion in accordance with an embodiment of the invention is shown. In an example, a driver assistance display without camera and sensor fusion in accordance with an embodiment of the invention is illustrated by a view 400. The driver assistance display generally provides a vehicle operator with a simulated bird's eye view of the ground (roadway) around the vehicle. The simulated view is limited to obstacles on the ground (e.g., curbs, other vehicles, potholes, etc.).

In an example, a driver assistance display with camera and sensor fusion in accordance with an embodiment of the invention is illustrated by a simulated surround (or bird's eye) view 402. The driver assistance display in accordance with an embodiment of the invention generally provides a vehicle operator with a simulated bird's eye view of not only the ground (roadway) around the vehicle, but also objects (obstacles) above or near a top of the vehicle. For example, the driver assistance display in accordance with an embodiment of the invention may provide the simulated view 402 including an overlaid image 404 containing a portion of a tree 406 that overhangs the road. The simulated view 402 provided by the driver assistance display in accordance with an embodiment of the invention not only apprises an operator of hazards on the road around the vehicle, but also apprises the operator of obstacles above the vehicle that may pose a risk of damage or injury. Depending on a number of obstacles detected, additional overlaid images 404 may be composited within the surround view 402. Thus, the simulated surround view 402 provided by the driver assistance display with camera and sensor fusion in accordance with an embodiment of the invention provides an improvement in the amount of information and/or warning capability relative to previous systems.

Figure 9:
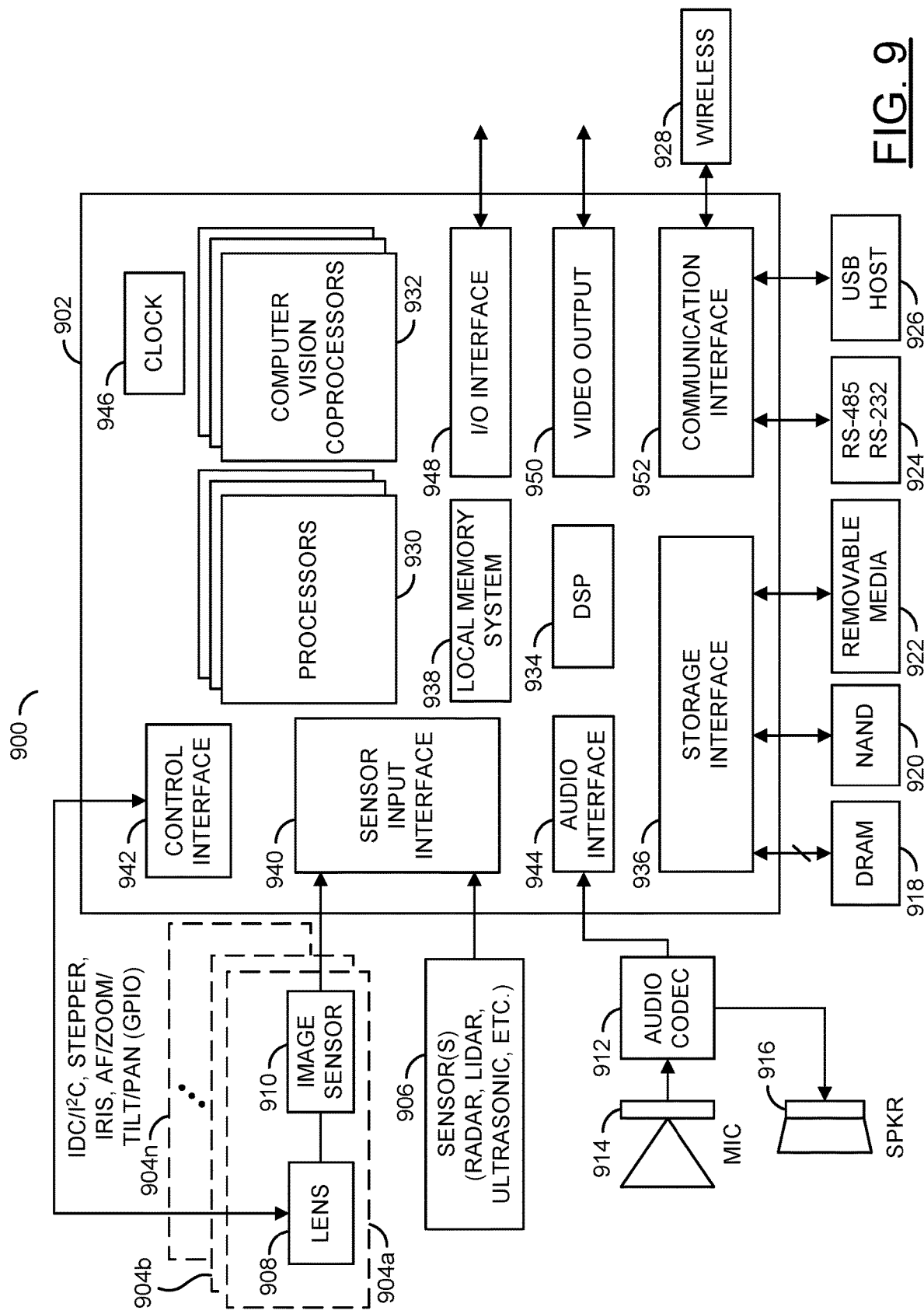
FIG. 9 is a diagram illustrating an example implementation of a camera system in accordance with an embodiment of the invention.

Referring to FIG. 9, a diagram of a camera system 900 is shown illustrating an example implementation of a computer vision system in accordance with an embodiment of the invention. In one example, the electronics of the camera system 900 may be implemented as one or more integrated circuits. In an example, the camera system 900 may be built around a processor/camera chip (or circuit) 902. In an example, the processor/camera chip 902 may be implemented as an application specific integrated circuit (ASIC) or system on chip (SOC). The processor/camera circuit 902 generally incorporates hardware and/or software/firmware that may be configured to implement the processors, circuits, and processes described above in connection with FIG. 1 through FIG. 8.

In an example, the processor/camera circuit 902 may be connected to one or more lens and image sensor assemblies 904a-904n and one or more sensors 906. In some embodiments, the lens and sensor assemblies 904a-904n may be a component of the processor/camera circuit 902 (e.g., a SoC component). In some embodiments, the lens and image sensor assemblies 904a-904n may be a separate component from the processor/camera circuit 902 (e.g., the lens and image sensor assembly may be an interchangeable component compatible with the processor/camera circuit 902). In some embodiments, the lens and image sensor assemblies 904a-904n may be part of a separate camera connected to the processor/camera circuit 902 (e.g., via a video cable, a high definition media interface (HDMI) cable, a universal serial bus (USB) cable, an Ethernet cable, or wireless link). In some embodiments, the one or more sensors 906 may be part of the separate camera connected to the processor/camera circuit 902 or installed in a vehicle in which the processor/camera circuit 902 is installed. The sensors 906 may be connected to the processor/camera circuit 902 via a communication channel including, but not limited to, an electronic vehicle bus, a high definition media interface (HDMI) cable, a universal serial bus (USB) cable, an Ethernet cable, or wireless link.

The sensors 906 may include detection and ranging sensors (e.g., radar, lidar, ultrasonic, etc.). Outputs of the sensors 906 may be used to augment image data received from the lens and image sensor assemblies 904a-904n. In an example, outputs of the lens and image sensor assemblies 904a-904n and the sensors 906 may be combined (e.g., via a sensor fusion operation) to provide enhanced object and/or obstacle detection.

The lens and sensor assemblies 904a-904n may comprise a block (or circuit) 908 and/or a block (or circuit) 910. The circuit 908 may be associated with a lens assembly. The circuit 910 may be a high dynamic range (HDR) image sensor. The lens and image sensor assemblies 904a-904n may comprise other components (not shown). The number, type and/or function of the components of the lens and image sensor assemblies 904a-904n may be varied according to the design criteria of a particular implementation.

The lens assembly 908 may capture and/or focus light input received from the environment near the camera 60. The lens assembly 908 may capture and/or focus light for the image sensor 910. The lens assembly 908 may implement an optical lens. The lens assembly 908 may provide a zooming feature and/or a focusing feature. The lens assembly 908 may be implemented with additional circuitry (e.g., motors) to adjust a direction, zoom and/or aperture of the lens assembly 908. The lens assembly 908 may be directed, tilted, panned, zoomed and/or rotated to provide a targeted view of the environment near the camera 60.

The image sensor 910 may receive light from the lens assembly 908. The image sensor 910 may be configured to transform the received focused light into digital data (e.g., bitstreams). In some embodiments, the image sensor 910 may perform an analog to digital conversion. For example, the image sensor 910 may perform a photoelectric conversion of the focused light received from the lens assembly 908. The image sensor 910 may present converted image data as a color filter array (CFA) formatted bitstream. The processor/camera circuit 902 may transform the bitstream into video data, video files and/or video frames (e.g., human-legible content).

The processor/camera circuit 902 may also be connected to (i) an optional audio input/output circuit including an audio codec 912, a microphone 914, and a speaker 916, (ii) a memory 918, which may include dynamic random access memory (DRAM), (iii) a non-volatile memory (e.g., NAND flash memory) 920, a removable media (e.g., SD, SDXC, etc.) 922, one or more serial (e.g., RS-485, RS-232, etc.) devices 924, one or more universal serial bus (USB) devices (e.g., a USB host) 926, and a wireless communication device 928.

In various embodiments, the processor/camera circuit 902 may comprise a number of blocks (or circuits) 930, a number of blocks (or circuits) 932, a block (or circuit) 934, a block (or circuit) 936, a block (or circuit) 938, a block (or circuit) 940, a block (or circuit) 942, a block (or circuit) 944, a block (or circuit) 946, a block (or circuit) 948, a block (or circuit) 950, and/or a block (or circuit) 952. The number of circuits 930 may be processor circuits. In various embodiments, the circuits 930 may include one or more embedded processors (e.g., ARM, etc.). The circuits 932 may implement a number of computer vision related coprocessor circuits. In an example, one or more of the circuits 932 may implement a two-stage object detection engine in accordance with an example embodiment of the invention. The circuit 934 may be a digital signal processing (DSP) module. In some embodiments, the circuit 934 may implement separate image DSP and video DSP modules. The circuit 936 may be a storage interface. The circuit 936 may interface the processor/camera circuit 902 with the DRAM 918, the non-volatile memory 920, and the removable media 922.

The circuit 938 may implement a local memory system. In some embodiments, the local memory system 938 may include, but is not limited to a cache (e.g., L2CACHE), a direct memory access (DMA) engine, graphic direct memory access (GDMA) engine, and fast random access memory. The circuit 940 may implement a sensor input (or interface). The circuit 942 may implement one or more control interfaces including but not limited to an inter device communication (IDC) interface, an inter integrated circuit ($I^2C$) interface, a serial peripheral interface (SPI), and a pulse width modulation (PWM) interface. The circuit 944 may implement an audio interface (e.g., an $I^2S$ interface, etc.). The circuit 946 may implement a clock circuit including but not limited to a real time clock (RTC), a watchdog timer (WDT), and/or one or more programmable timers. The circuit 948 may implement an input/output (I/O) interface. The circuit 950 may be a video output module. The circuit 952 may be a communication module. The circuits 930 through 952 may be connected to each other using one or more buses, interfaces, traces, protocols, etc.

The circuit 920 may be implemented as a nonvolatile memory (e.g., NAND flash memory, NOR flash memory, etc.). The circuit 922 may comprise one or more removable media cards (e.g., secure digital media (SD), secure digital extended capacity media (SDXC), etc.). The circuit 924 may comprise one or more serial interfaces (e.g., RS-485, RS-232, etc.). The circuit 926 may be an interface for connecting to or acting as a universal serial bus (USB) host. The circuit 928 may be a wireless interface for communicating with a user device (e.g., a smart phone, a computer, a tablet computing device, cloud resources, etc.). In various embodiments, the circuits 904-928 may be implemented as components external to the processor/camera circuit 902. In some embodiments, the circuits 904a-928 may be components on-board the processor/camera circuit 902.

The control interface 942 may be configured to generate signals (e.g., IDC/I2C, STEPPER, IRIS, AF/ZOOM/TILT/PAN, etc.) for controlling the lens and image sensor assemblies 904a-904n. The signal IRIS may be configured to adjust an iris for a respective lens assembly 908. The interface 942 may enable the processor/camera circuit 902 to control the lens and image sensor assemblies 904a-904n.

The storage interface 936 may be configured to manage one or more types of storage and/or data access. In one example, the storage interface 936 may implement a direct memory access (DMA) engine and/or a graphics direct memory access (GDMA). In another example, the storage interface 936 may implement a secure digital (SD) card interface (e.g., to connect to the removable media 922). In various embodiments, programming code (e.g., executable instructions for controlling various processors and encoders of the processor/camera circuit 902) may be stored in one or more of the memories (e.g., the DRAM 918, the NAND 920, etc.). When executed by one or more of the processors 930, the programming code generally causes one or more components in the processor/camera circuit 902 to configure video synchronization operations and start video frame processing operations. The resulting compressed video signal may be presented to the storage interface 936, the video output 950 and/or communication interface 952. The storage interface 936 may transfer program code and/or data between external media (e.g., the DRAM 918, the NAND 920, the removable media 922, etc.) and the local (internal) memory system 938.

The sensor input 940 may be configured to send/receive data to/from the image sensor 910. In one example, the sensor input 940 may comprise an image sensor input interface. The sensor input 940 may be configured to transmit captured images (e.g., picture element, pixel, data) from the image sensor 910 to the DSP module 934, one or more of the processors 930 and/or one or more of the coprocessors 932. The data received by the sensor input 940 may be used by the DSP 934 to determine a luminance (Y) and chrominance (U and V) values from the image sensor 910. The sensor input 940 may provide an interface to the lens and image sensor assemblies 904a-904n. The sensor input interface 940 may enable the processor/camera circuit 902 to capture image data from the lens and image sensor assemblies 904a-904n.

The audio interface 944 may be configured to send/receive audio data. In one example, the audio interface 944 may implement an audio inter-IC sound ($I^2S$) interface. The audio interface 944 may be configured to send/receive data in a format implemented by the audio codec 912.

The DSP module 934 may be configured to process digital signals. The DSP module 934 may comprise an image digital signal processor (IDSP), a video digital signal processor DSP (VDSP) and/or an audio digital signal processor (ADSP). The DSP module 934 may be configured to receive information (e.g., pixel data values captured by the image sensor 910) from the sensor input 940. The DSP module 934 may be configured to determine the pixel values (e.g., RGB, YUV, luminance, chrominance, etc.) from the information received from the sensor input 940. The DSP module 934 may be further configured to support or provide a sensor RGB to YUV raw image pipeline to improve image quality, bad pixel detection and correction, demosaicing, white balance, color and tone correction, gamma correction, adjustment of hue, saturation, brightness and contrast adjustment, chrominance and luminance noise filtering.

The I/O interface 948 may be configured to send/receive data. The data sent/received by the I/O interface 948 may be miscellaneous information and/or control data. In one example, the I/O interface 948 may implement one or more of a general purpose input/output (GPIO) interface, an analog-to-digital converter (ADC) module, a digital-to-analog converter (DAC) module, an infrared (IR) remote interface, a pulse width modulation (PWM) module, a universal asynchronous receiver transmitter (UART), an infrared (IR) remote interface, and/or one or more synchronous data communications interfaces (IDC SPI/SSI).

The video output module 950 may be configured to send video data. For example, the processor/camera circuit 902 may be connected to an external device (e.g., a TV, a monitor, a laptop computer, a tablet computing device, etc.). The video output module 950 may implement a high-definition multimedia interface (HDMI), a PAL/NTSC interface, an LCD/TV/Parallel interface and/or a DisplayPort interface.

The communication module 952 may be configured to send/receive data. The data sent/received by the communication module 952 may be formatted according to a particular protocol (e.g., Bluetooth®, ZigBee®, USB, Wi-Fi, UART, etc.). In one example, the communication module 952 may implement a secure digital input output (SDIO) interface. The communication module 952 may include support for wireless communication by one or more wireless protocols such as Bluetooth®, ZigBee®, Institute of Electrical and Electronics Engineering (IEEE) 802.11, IEEE 802.15, IEEE 802.15.1, IEEE 802.15.2, IEEE 802.15.3, IEEE 802.15.4, IEEE 802.15.5, and/or IEEE 802.20, GSM, CDMA, GPRS, UMTS, CDMA2000, 3GPP LTE, 4G/HSPA/WiMAX, SMS, etc. The communication module 952 may also include support for communicating using one or more of the universal serial bus protocols (e.g., USB 1.0, 2.0, 3.0, etc.). The processor/camera circuit 902 may also be configured to be powered via a USB connection. However, other communication and/or power interfaces may be implemented accordingly to meet the design criteria of a particular application.

Figure 10:
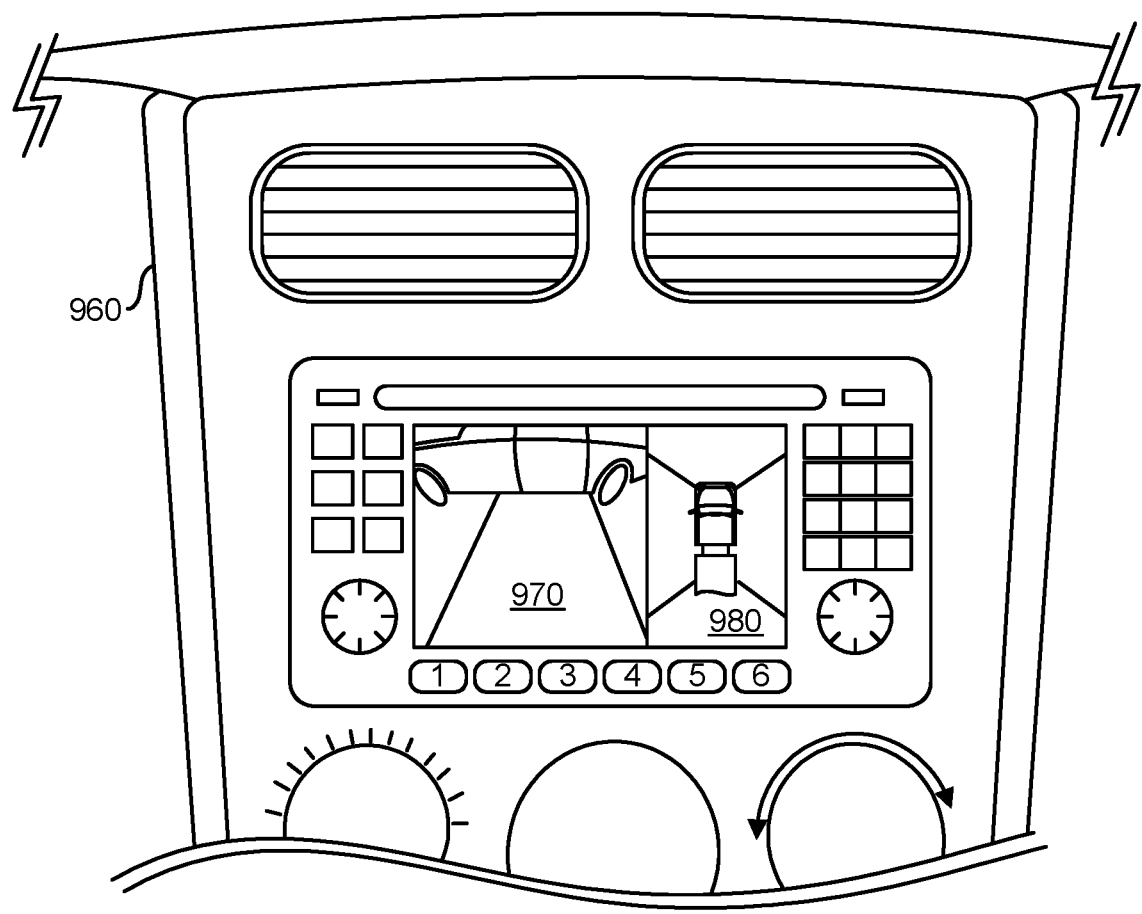
FIG. 10 is a diagram illustrating an example implementation of a driver assistance display in accordance with an embodiment of the invention.

The processor/camera circuit 902 may be configured (e.g., programmed) to control the one or more lens assemblies 908 and the one or more image sensors 910. The processor/camera circuit 902 may receive raw image data from the image sensor(s) 910. The processor/camera circuit 902 may encode the raw image data into a plurality of encoded video streams simultaneously (in parallel). The plurality of video streams may have a variety of resolutions (e.g., VGA, WVGA, QVGA, SD, HD, Ultra HD, 4K, etc.). The processor/camera circuit 902 may receive encoded and/or uncoded (e.g., raw) audio data at the audio interface 944. The processor/camera circuit 902 may also receive encoded audio data from the communication interface 952 (e.g., USB and/or SDIO). The processor/camera circuit 902 may provide encoded video data to the wireless interface 928 (e.g., using a USB host interface). The wireless interface 928 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The processor/camera circuit 902 may also include support for communication using one or more of the universal serial bus protocols (e.g., USB 1.0, 2.0, 3.0, etc.). Referring to FIG. 10, the diagram of a dashboard 960 is shown. The dashboard 960 may include a screen (or display) 970 and a screen (or display) 980. In an example, the screen 970 and the screen 980 may be implemented as separate views on a single screen. In another example, the screen 970 and the screen 980 may be separate screens.

Each of the cameras 100 and 100' may include a wide angle (e.g., 180 degree field of view) lens that may include full high definition (HD) (or higher) resolution sensors. For example, a fish eye lens-type sensor may be implemented. The bottom portion of the video feed may be cropped and corrected for geometric distortion in the circuit 902 to generate a view showing the ground near the vehicles 90 and 90'. In some embodiments, an upper portion of the video feed may be cropped to generate a view showing the environment around the top of the vehicles 90 and 90'. The resolution of each of the views may be increased or decreased, but may be sufficient for presenting a composited "bird's eye" view shown on the screen 980. In an example, the camera feeds may be implemented have 1920×600 lines of resolution. The SoC circuit 902 may combine a number of such feeds (e.g., 2, 3, 4, etc.) into a single bird's eye view. However, other resolutions (e.g., 1920×1080, 1280×720, 640×480, 720×576, 720×480, etc.) may be implemented accordingly yo meet design criteria of a particular implementation. For the maneuvering view (e.g., shown on screen 980), resolutions such as 640×480 or 800×600 or 1280×720 may be utilized. The maneuvering view may be based on either the front camera view, or by stitching together two or more smaller views in the circuit 902 from the various cameras 100 and 100'.

The circuit 902 may generate various views by processing signals from the cameras 100 and/or 100' with a "dewarp" engine. The various views may be used to provide driver assistance analytics. For example, an obstacle warning may be implemented. The circuit 902 may implement a calibration process. For example, the cameras 100 and 110' may move slightly during the life of the vehicles 90 and 90'. The circuit 902 may compensate for such movement. The particular type of compensation implemented may be varied to meet the design criteria of a particular implementation.

The functions and structures illustrated in the diagrams of FIGS. 1 to 10 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a surround view display; and
   a processing circuit comprising a first input to receive a first signal from one or more primary surround view cameras, a second input to receive a second signal from one or more supplementary cameras, a third input to receive a third signal from at least one respective detection and ranging sensor, and an output connected to the surround view display, wherein said processing circuit is configured to (i) use said first signal from the one or more primary surround view cameras to produce a two-dimensional view on the surround view display of an area around a bottom of a vehicle, (ii) detect obstacles around and above a top of the vehicle using the third signal from the at least one respective detection and ranging sensor, (iii) divide the second signal from the one or more supplementary cameras into portions to obtain a portion less than an entire field of view of the one or more supplementary cameras in which an obstacle is detected, (iv) perform a dewarping operation on the portion less than the entire field of view of the one or more supplementary cameras in which the obstacle is detected, and (v) generate an overlay view containing the portion less than the entire field of view of the one or more supplementary cameras in which the obstacle is detected on the two-dimensional view of the area around the bottom of the vehicle to inform an operator of the detected obstacle above the vehicle.

2. The apparatus according to claim 1, wherein each of the one or more supplementary cameras has a field of view less than or equal to 180 degrees.

3. The apparatus according to claim 1, wherein each of the one or more supplementary cameras has a fisheye lens.

4. The apparatus according to claim 1, wherein the at least one respective detection and ranging sensor utilizes at least one of radar, lidar, and ultrasound.

5. The apparatus according to claim 1, wherein the one or more primary surround view cameras are placed on the vehicle to have a view of a roadway and ground around the bottom of the vehicle.

6. The apparatus according to claim 1, wherein the one or more supplementary cameras are placed on the vehicle higher than the one or more primary surround view cameras to have views of an environment around and above the top of the vehicle outside a field of view of the one or more primary surround view cameras.

7. The apparatus according to claim 1, wherein the at least one respective detection and ranging sensor is mounted adjacent to a respective one of the one or more supplementary cameras and configured to detect obstacles within a respective field of view of the respective one of the one or more supplementary cameras.

8. The apparatus according to claim 1, wherein the dewarping operation performed by the processing circuit is directed by the third signal received from the at least one respective detection and ranging sensor.

9. The apparatus according to claim 1, wherein the processing circuit provides one or more of obstacle tracking, obstacle detection, obstacle recognition, or obstacle identification by performing a camera and sensor fusion operation using the second signal received from the one or more supplementary cameras and the third signal received from the at least one respective detection and ranging sensor.

10. The apparatus according to claim 1, wherein the vehicle comprises an autonomous vehicle.

11. A method of obstacle warning comprising:
    obtaining views of a roadway and ground around a vehicle from one or more primary surround view cameras mounted on the vehicle;
    obtaining views of an environment around and above a top of the vehicle unseen by the one or more primary surround view cameras from one or more supplementary cameras mounted at a location higher on the vehicle than the location of the primary surround view cameras;
    detecting obstacles around and above the top of the vehicle using one or more respective detection and ranging sensors mounted adjacent to each of the one or more supplementary cameras;
    dividing an output of each of the one or more supplementary cameras into portions to obtain a portion less than an entire respective field of view of a respective one of the one or more supplementary cameras in which an obstacle is detected;
    performing a dewarping operation on the portion less than the entire respective field of view of the respective one of the one or more supplementary cameras in which the obstacle is detected; and
    generating a surround view display, wherein (i) an output of each of the one or more primary surround view cameras is used to produce a two-dimensional view of an area around the bottom of the vehicle and (ii) the portion less than the entire respective field of view of the respective one of the one or more supplementary cameras in which the obstacle is detected is used to produce an overlay view which is overlaid on the two-dimensional view of the area around the bottom of the vehicle to inform an operator of the detected obstacle above the vehicle.

12. The method according to claim 11, wherein each of the one or more supplementary cameras has a field of view less than or equal to 180 degrees.

13. The method according to claim 11, wherein each of the one or more supplementary cameras has a fisheye lens.

14. The method according to claim 11, wherein the one or more respective detection and ranging sensors utilizes at least one of radar, lidar, and ultrasound.

15. The method according to claim 11, wherein the dewarping operation is performed by a processing circuit and is directed by an output of the one or more respective detection and ranging sensors.

16. The method according to claim 15, wherein the processing circuit performs a camera and sensor fusion operation using outputs of the one or more supplementary cameras and the one or more respective detection and ranging sensors.

17. The method according to claim 16, further comprising performing one or more of obstacle tracking, obstacle detection, obstacle recognition, or obstacle identification using the camera and sensor fusion operation performed by the processing circuit.

18. The method according to claim 11, further comprising issuing an obstacle warning to the operator of the vehicle, wherein the surround view display directs attention of the operator to at least one of a hazard on the roadway around the vehicle and an obstacle above the vehicle that may pose a risk of damage or injury.

19. The method according to claim 11, further comprising limiting a number of overlay views generated to those containing detected objects to optimize utilization of one or more of de-warping engines, image processors, digital signal processors, or memory.

20. The method according to claim 11, wherein the dewarping operation is applied only to image data corresponding to the portion of the respective field of view of the respective one of the one or more supplementary cameras in which the obstacle is detected.

\* \* \* \* \*